Nov. 24, 1925.

E. J. FAGER, JR

WOODWORKING MACHINE

Filed Feb. 13, 1922    3 Sheets-Sheet 1

Inventor
EDWIN J. FAGER, JR.
By
Attorney

Nov. 24, 1925.  
E. J. FAGER, JR  
1,562,826  
WOODWORKING MACHINE  
Filed Feb. 13, 1922  
3 Sheets-Sheet 2
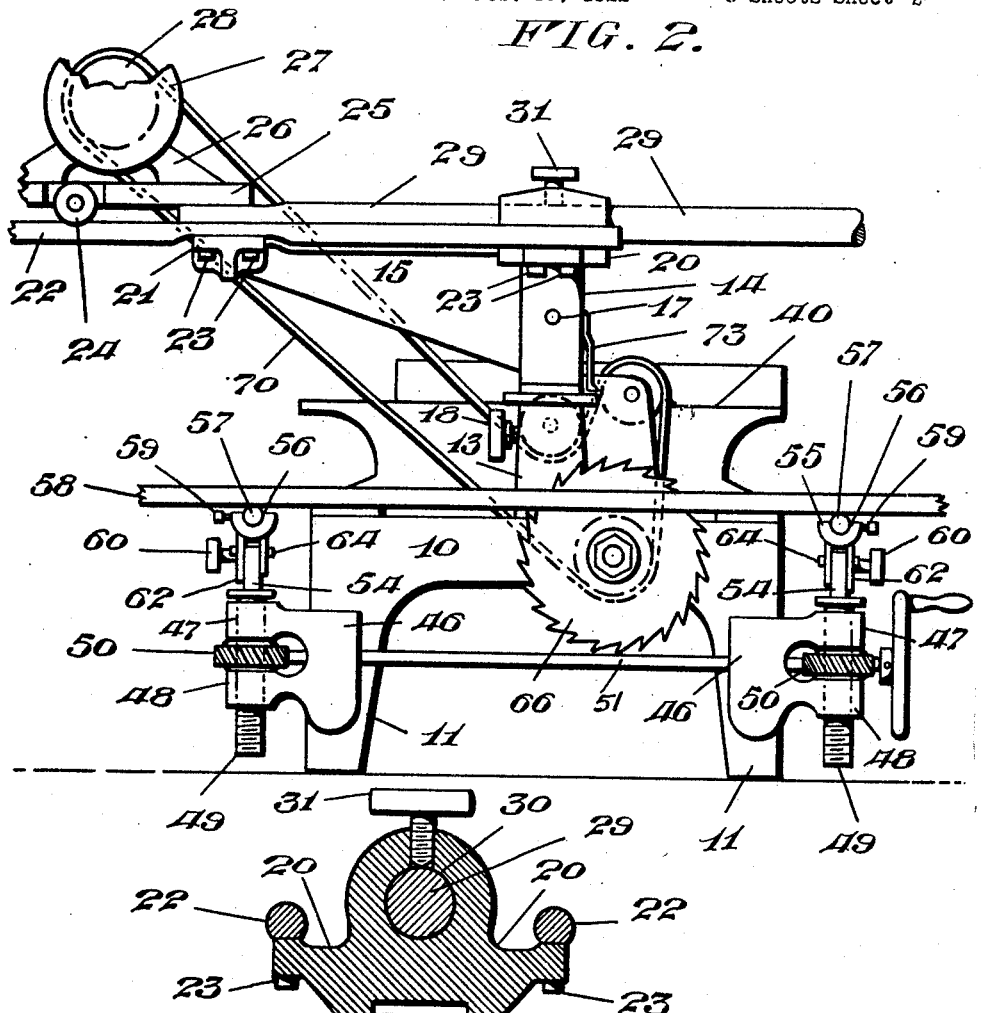
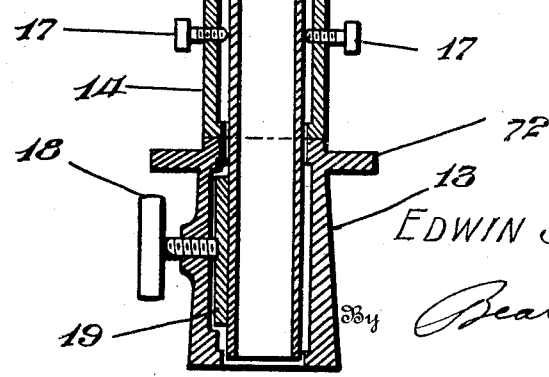
Inventor  
EDWIN J. FAGER, JR.  
By  
Attorney Nov. 24, 1925.

E. J. FAGER, JR 1,562,826

WOODWORKING MACHINE

Filed Feb. 13, 1922    3 Sheets-Sheet 3

Inventor
EDWIN J. FAGER, JR.

By
Attorney

Patented Nov. 24, 1925.

1,562,826

UNITED STATES PATENT OFFICE.

EDWIN J. FAGER, JR., OF HARRISBURG, PENNSYLVANIA.

WOODWORKING MACHINE.

Application filed February 13, 1922. Serial No. 536,337.

*To all whom it may concern:*

Be it known that I, EDWIN J. FAGER, Jr., a citizen of the United States, residing at Harrisburg, in the county of Dauphin and State of Pennsylvania, have invented certain new and useful Improvements in Woodworking Machines; and I hereby declare that the following is a full, clear, and exact description thereof, reference being had to the accompanying drawings, which form part of the specification.

This invention relates to improvements in woodworking machines, the specification and drawings of which are similar to my pending application Serial Number 497,914 filed September 2, 1921, with the exception of a slight change in the mounting of the carriage 25 upon the rods 22.

An object of this invention is the combination with a table of the traveling motor and saw whose track is pivotally mounted to produce miter cuts, and also to swing the said saw out of the way and bring the motor shaft parallel to a shaft carrying a tool in operative relation to said table so that the motor belt may be interchangeably engaged with said second shaft.

Figure 1:
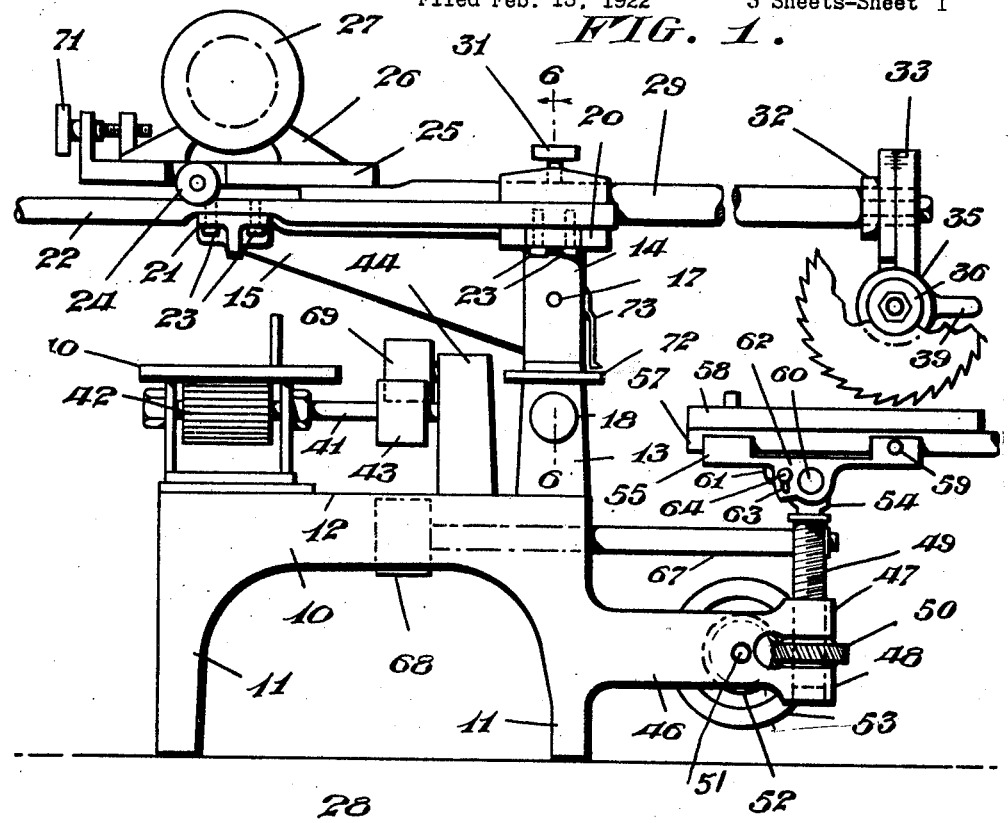
Figure 3:
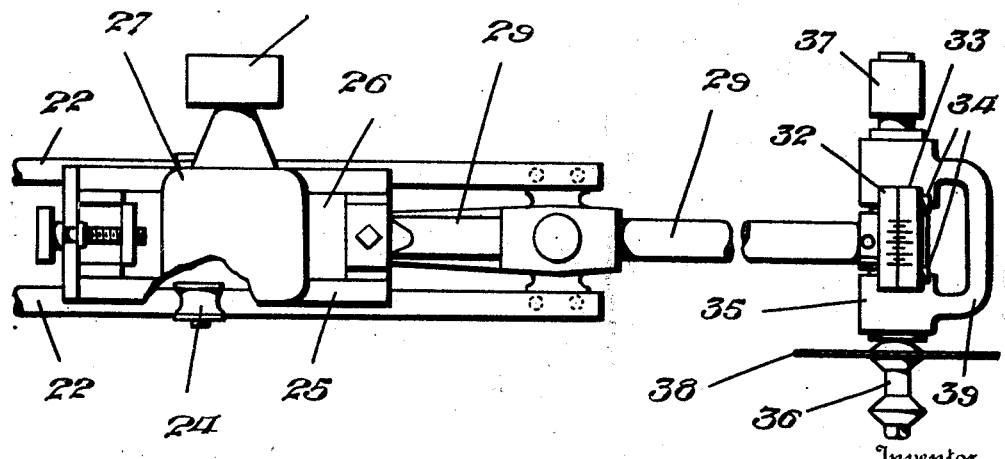
Figure 7:
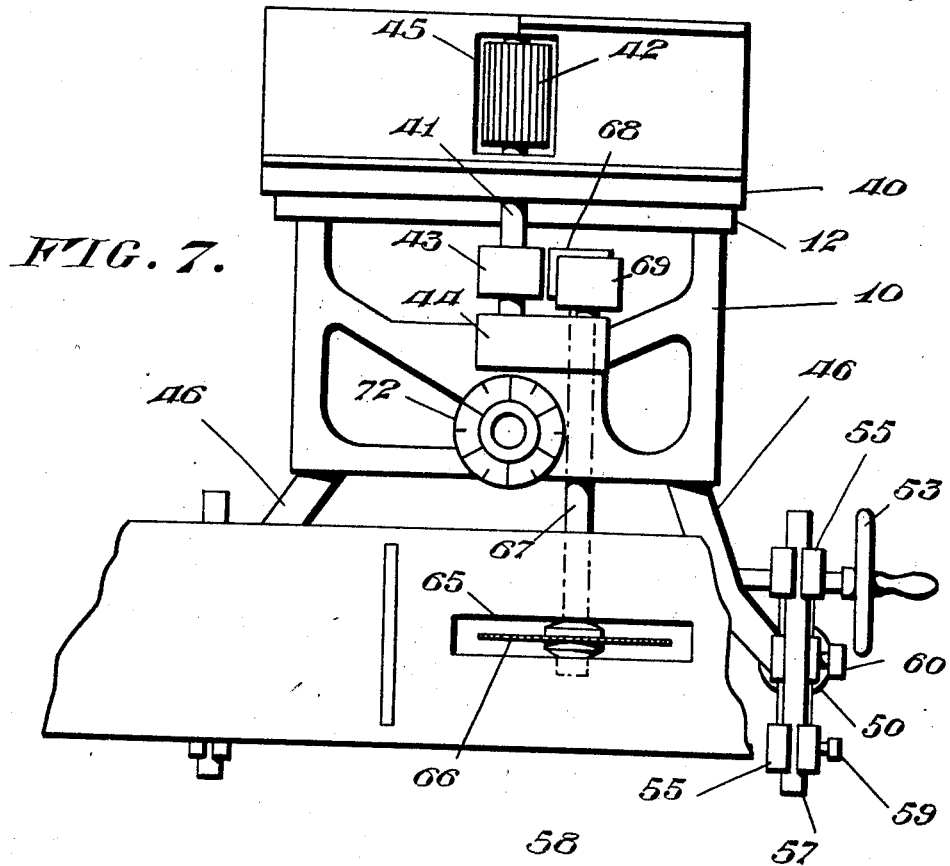
Figure 4:
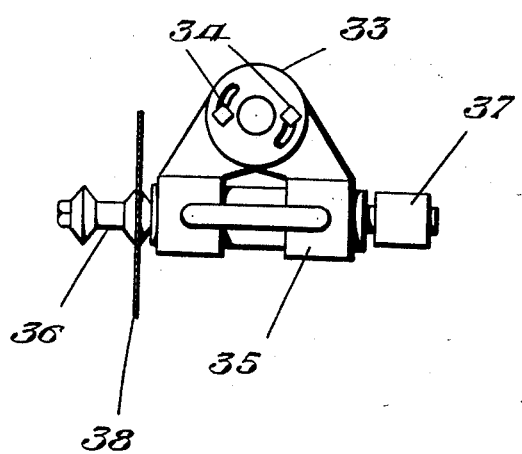
Figure 5:
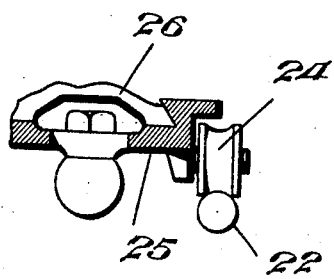

Referring to the drawings: Fig. 1 is a side view of my invention in which the cross-cut saw is shown in working position. Fig. 2 is an end view with the cross-cut saw swung out of position and the rip-saw and jointer head properly belted to the motor. Fig. 3 is a top plan view showing the motor and carriage partly broken away, track rods, top of rotatable post and cross-cut saw and cross-head. Fig. 4 is a front view of the cross-head and mandrel. Fig. 5 is an enlarged sectional view of a portion of the carriage showing position of carriage wheels. Fig. 6 is a vertical cross section on the line 6—6 of Fig. 1 showing the interior arrangement of the column base and rotatable post. Fig. 7 is a plan view of my machine with the rotatable post removed.

Referring more particularly to the drawings, my invention consists in a table casting 10, having legs 11 and a table top 12 upon which is located a raised portion which I shall term the column base 13, this supports a column 14 with an overhanging arm 15, which I will hereafter refer to as rotatable post 14.

The column base 13 and the rotatable post 14 have bored therein a vertical hole for the reception of a hollow pipe 16 which is securely babbitted in the rotatable post and held in rigid relation thereto by set screws 17. The lower end of this hollow pipe 16 enters the column base 13 and is there surrounded by Babbitt metal, revolving therein like the pintle of a hinge.

A lateral screw 18 passes through the column base 13 and there attaches to a brake shoe 19 which engages the hollow pipe 16 thus providing a locking means to hold the rotatable post 14 in any desired rotary position.

The column 14 is provided at its top with two oppositely disposed lateral extensions 20 and the above mentioned overhanging arm 15 is provided at its outer end with two corresponding extensions 21.

On these extensions 20 and 21 are rigidly mounted two rods 22 which serve as tracks. These rods are held in place by screws 23, this being a convenient form of attachment. Upon these rods is mounted by means of two wheels 24, a carriage 25, upon this carriage is slidably and adjustably secured a frame 26, supporting a motor 27 with a driving pulley 28. To the carriage 25 is rigidly secured a sliding rod 29 which is above and parallel with the track rods 22. This sliding rod 29 passes through a bore 30 provided in the top of the rotatable post 14, positioned directly over the center of the hollow pipe 16. An adjustable screw 31 passes through the top of the rotatable post 14 and secures the sliding rod 29 in a fixed position when so desired. To the other extremity of the sliding rod 29 is rigidly secured a collar 32. Another collar 33 is loosely mounted upon rod 29 and adjacent to collar 32 and connected thereto in rotary adjustment by bolts 34. This collar 33 is integral with a cross head 35 through which passes a saw mandrel 36, with a pulley 37 at the far end of said mandrel for belt connection to motor pulley 28.

The cross head 35 is adjustably connected as explained above by means of screws or bolts 34 to the fixed collar 32, this permits of adjusting the cross-cut saw 38 in any slanting position desired. A handle 39 is attached to the cross head 35 for pulling the cross-cut saw through the work.

On the far side from the column base 13 and upon the table top 12 is erected an auxiliary frame and table top 40. Between this auxiliary table top 40 and the main table top 12 is suitably journaled a shaft 41 to which is attached a jointer head 42 and on the far end of the shaft a pulley 43 is mounted. The said shaft is journaled respectively in the auxiliary frame and the idler pulley frame 44. The jointer head 42 extends through an opening 45 in the auxiliary table top 40, sufficiently far to perform its normal functions.

The table casting 10 is also provided with two heavy arms 46, extending laterally away from and on a lower level than the main table top 12 to a point beneath the cross-cut saw. These arms 46 are divided at their far extremities in a manner resembling the jaws of a large open handed wrench. These jaws 47 and 48 are laterally placed one above the other and through them is a laterally extending hole for the reception and guidance of a screw or elevating post 49. In assembling, this post is first passed through the upper jaw 47, then through the internally threaded hub of a spiral gear 50, and then through the lower jaw 48.

A rod 51 runs laterally from arm 46 to arm 46 being suitably journalled therein. To this rod are securely fastened spiral gears 52. These gears respectively mesh with gears 50. To one end of the rod 51 is attached a hand wheel 53, the revolutions of which turn the rod 51, carrying the gears 52 which turn the gears 50. The gears 50, held between the jaws 47 and 48, and being interiorly threaded cause the elevating screws on which they are mounted to move up or down.

On the top of the elevating screws 49, are mounted by means of hinges 54, cross arm brackets 55, provided with two arms carrying three-quarter bushings 56. Through these bushings are slidingly mounted rods 57, which are rigidly secured to a table top 58. Through one bushing on each cross arm bracket 55 is an adjustment screw 59, the purpose being to allow the table top 58, to slide in the bushings 56 or to be held rigid therein.

The hinges 54 are provided with adjustable clamping screw pintles 60, which may be tightened to hold the table top 58 in any desired slanting position. To keep the table top 58 from tilting too far when these pintle screws 60 are loosened a small triangular shaped brace 61 is rigidly fastened to the elevating screws 49, and a similar brace 62, containing a slot 63, is fastened to the cross arm bracket 55. A pin 64 is secured in the brace 61 and extends through the slot 63 thus limiting the swing of the table to the length of slot 63.

A large slot 65 in the table top 58 permits said table to be lowered over the rip-saw 66 to any desired degree. This rip-saw 66 is mounted upon a shaft 67 suitably journaled in the main table casting 10 and having mounted on its other end a pulley 68, so placed as to be in line with pulleys 43 and 69. When it is desired to use the jointer head and rip-saw at the same time the rotatable post 14 is revolved in the column base 13, so that the motor pulley 28, the jointer head pulley 43, and the rip-saw pulley 68 are in proper alignment. In order to have the rip-saw turn in a reverse direction from the jointer head, a desired condition, an idler pulley 69 is mounted upon a frame 44 to operate with pulleys 28, 43, and 68.

When the rotatable post 14 is properly placed, the adjusting screw 18 is tightened forcing the brake shoe 19 against the hollow pipe 16, thus rigidly holding the rotatable post. The driving belt 70 is now placed upon the pulleys as shown in Fig. 2. To obtain the proper tension upon the belt, the sliding rod 29 is moved and held in fixed position by adjusting screw 31. For minor adjustments the screw 71 may be used to adjust the motor frame 26 on the carriage 25.

The carriage 25 has two wheels 24 which keep the carriage 25 steady and also keeps rod 29 from turning through side pressure upon the cross-cut saw 38.

Fastened to the rotatable post and pointing to a scale 72, scribed on the column base 13, is an indicating finger 73. This scale assists in setting the rotatable post in any desired rotary position. For similar purpose two scales are scribed on the outer adjacent surfaces of the collars 32 and 33.

It will be noted that the sliding rod does not support the motor carriage; said carriage being supported by and movable on a track way. The carriage in fact supports the sliding rod when said rod is under pressure due to cutting.

I do not claim, in this case, a mitering machine having a traveling saw mounted on a rod sliding in a rotatable post, thus mitering at one angle, and angularly adjustable on the end of said rod to cut a miter in a different plane, the same being covered by my Patent No. 1,449,317, May 20, 1923.

Claim:

In a woodworking machine the combination of a motor; a carriage slidably supporting said motor; a rotatable post slidably supporting said carriage; a tool-carrying cross-head slidably supported radially of the post; a base frame supporting said rotatable post; a mandrel-carrying shaft mounted in said frame; a second tool-carrying shaft mounted in parallel relation to said first shaft; a third idler pulley-carrying shaft interposed between said first and second shafts; and means for operatively connecting said motor alternatively with said tool-carrying cross-head and said first, second and third shafts.

In testimony that I claim the foregoing as my own, I affix my signature.

EDWIN J. FAGER, Jr.